United States Patent
Luff et al.

(10) Patent No.: US 11,703,598 B2
(45) Date of Patent: Jul. 18, 2023

(54) STEERING OF LIDAR OUTPUT SIGNALS

(71) Applicant: SiLC Technologies, Inc., Monrovia, CA (US)

(72) Inventors: Bradley Jonathan Luff, La Canada Flintridge, CA (US); Mehdi Asghari, La Canada Flintridge, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 654 days.

(21) Appl. No.: 16/687,656

(22) Filed: Nov. 18, 2019

(65) Prior Publication Data
US 2021/0149056 A1    May 20, 2021

(51) Int. Cl.
*G01S 17/93* (2020.01)
*G02B 6/35* (2006.01)
*G01S 17/89* (2020.01)

(52) U.S. Cl.
CPC ............. *G01S 17/93* (2013.01); *G01S 17/89* (2013.01); *G02B 6/3542* (2013.01)

(58) Field of Classification Search
CPC .......... G01S 17/00; G01S 17/02; G01S 17/06; G01S 17/08; G01S 17/32; G01S 17/42; G01S 17/88; G01S 17/89; G01S 17/93; G01S 17/931; G01S 7/00; G01S 7/48; G01S 7/481; G01S 7/4811; G01S 7/4812; G01S 7/4814; G01S 7/4815; G01S 7/4817; G02B 2006/12083; G02B 2006/12097; G02B 6/00; G02B 6/10; G02B 6/12; G02B 6/122; G02B 6/124; G02B 6/24; G02B 6/26; G02B 6/28; G02B 6/293; G02B 6/29304; G02B 6/29316; G02B 6/29325; G02B 6/35; G02B 6/354
See application file for complete search history.

(56) References Cited

U.S. PATENT DOCUMENTS 5,977,538 A    11/1999  Unger et al.
9,157,790 B2   10/2015  Shpunt et al.
(Continued)

FOREIGN PATENT DOCUMENTS

EP    3 276 371 A1    1/2018
KR    20060086182 A   7/2006
(Continued)

OTHER PUBLICATIONS

Tang, Xiaofan, International Preliminary Report on Patentability and Written Opinion, PCT/US2019/036604, The International Bureau of WIPO, dated Jan. 7, 2021.
(Continued)

*Primary Examiner* — Charles J Han
(74) *Attorney, Agent, or Firm* — Gavrilovich, Dodd & Lindsey LLP

(57) ABSTRACT

A LIDAR system includes a LIDAR chip configured to output a LIDAR output signal. The LIDAR chip includes a redirection component and alternate waveguides. The redirection component receives an outgoing LIDAR signal from any one of multiple alternate waveguides. The LIDAR output signal includes light from the outgoing LIDAR signal. A direction that the LIDAR output signal travels away from the LIDAR chip is a function of the alternate waveguide from which the redirection component receives the outgoing LIDAR signal.

16 Claims, 8 Drawing Sheets

(56) References Cited

U.S. PATENT DOCUMENTS

| | | |
|---|---|---|
| 9,753,351 B2 | 9/2017 | Eldada |
| 9,841,495 B2 | 12/2017 | Campbell et al. |
| 9,851,443 B2 | 12/2017 | Chen |
| 9,857,468 B1 | 1/2018 | Eichenholz et al. |
| 2012/0120382 A1 | 5/2012 | Silny et al. |
| 2014/0169392 A1 | 6/2014 | Kim |
| 2017/0184450 A1 | 6/2017 | Doylend et al. |
| 2017/0299697 A1 | 10/2017 | Swanson |
| 2017/0356983 A1 | 12/2017 | Jeong et al. |
| 2017/0371227 A1 | 12/2017 | Skirlo et al. |
| 2018/0024246 A1* | 1/2018 | Jeong .................. G02F 1/313 359/204.1 |
| 2018/0095284 A1 | 4/2018 | Welch et al. |
| 2019/0107623 A1 | 4/2019 | Campbell et al. |
| 2019/0317195 A1 | 10/2019 | Sun et al. |

FOREIGN PATENT DOCUMENTS

| | | |
|---|---|---|
| WO | 2015/200800 A1 | 12/2015 |
| WO | 2017/023107 A1 | 2/2017 |
| WO | 2017-102156 A1 | 6/2017 |
| WO | 2018/003852 A1 | 1/2018 |
| WO | 2019196135 A1 | 10/2019 |

OTHER PUBLICATIONS

Brosa, Anna-Maria, Extended European Search Report, Application No. 19824826.2, European Patent Office, dated Feb. 21, 2022.

Kang, Sung Chul, International Search Report and Written Opinion, PCT/US2019/036604, Korean Intellectual Property Office, dated Oct. 16, 2019.

Velodyne, HDL-64E S2 Datasheet, Retrieved from http://velodynelidar.com/lidar/products/brochure/HDL-64E%20S2%20datasheet_2010_lowres.pdf, 2017.

Sandborn, P.A.M.,"FMCW Lidar: Scaling to the Chip-Level and Improving Phase-Noise-Limited Performance," University of California, Berkeley, Fall 2017, 18 pp.

Woohyeong, Cho, Office Action, U.S. Appl. No. 16/277,790, United States Patent and Trademark Office, dated Mar. 25, 2022.

Kajita, Shinya, Office Action, Patent Application No. 2020-571353, Japan Patent Office, dated Mar. 24, 2023.

\* cited by examiner

STEERING OF LIDAR OUTPUT SIGNALS

RELATED APPLICATIONS

This application is related to U.S. patent application Ser. No. 16/277,790, filed on Feb. 15, 2019, and incorporated herein in its entirety.

FIELD

The invention relates to optical devices. In particular, the invention relates to LIDAR systems.

BACKGROUND

There is an increasing commercial demand for 3D sensing systems that can be economically deployed in applications such as ADAS (Advanced Driver Assistance Systems) and AR (Augmented Reality). LIDAR (Light Detection and Ranging) sensors are used to construct a 3D image of a target scene by illuminating the scene with laser light and measuring the returned signal.

Frequency Modulated Continuous Wave (FMCW) is an example of a coherent detection method can be used for LIDAR applications. The FMCW technique is capable of determining both distance and velocity of an object with a single measurement. Additionally, FMCW techniques have reduced sensitivity to ambient light and light from other LIDAR systems.

For many LIDAR applications there is a need to scan the light beam externally to build up an image of the field of view. Methods of scanning the beam include mechanical methods such as rotating the assembly containing the lasers, rotating mechanical mirrors, and MEMS mirrors. 'Solid-state' approaches (no moving parts) such as Optical Phased Arrays are of interest due to their lack of moving parts and may improve scanning speeds. However, the solid-state approaches that have been tried have limited angular ranges and require a large number of control elements. As a result, there is a need for a practical solid-state scanning mechanism.

SUMMARY

A LIDAR system includes a LIDAR chip configured to output a LIDAR output signal. The LIDAR chip includes a redirection component and alternate waveguides. The redirection component receives an outgoing LIDAR signal from any one of multiple alternate waveguides. The LIDAR output signal includes light from the outgoing LIDAR signal. A direction that the LIDAR output signal travels away from the LIDAR chip is a function of the alternate waveguide from which the redirection component receives the outgoing LIDAR signal.

BRIEF DESCRIPTION OF THE FIGURES

FIG. 2A is schematic of a topview of the output component.

FIG. 2B is a close-up of the portion of the output component encircled by the dashed line labeled B in FIG. 2A.

FIG. 2C is a cross section of the output component taken along the line labeled C in FIG. 2B.

FIG. 2D is a cross section of the output component taken along the line labeled D in FIG. 2B.

FIG. 2E is a cross section of the output component taken along the line labeled E in FIG. 2A.

FIG. 2F is a cross section of the output component taken along the line labeled F in FIG. 2A.

FIG. 3A is a topview of the output component.

FIG. 3B is an expanded view of a portion of the redirection component shown in FIG. 3A.

FIG. 4A is a topview of the optical switch.

FIG. 4B is a cross section of the optical switch shown in FIG. 4A taken along the line labeled B in FIG. 4A.

DESCRIPTION

A LIDAR system is configured to output a LIDAR output signal. An object in the path of the LIDAR output signal can reflect the LIDAR output signal. At least a portion of the light returns to the LIDAR chip as a LIDAR input signal. Electronics can use the LIDAR input signal to calculate LIDAR data (radial velocity and/or distance between an object external to the LIDAR system and the LIDAR system) for the object.

The LIDAR system includes an optical chip such as a Photonic Integrated Circuit (PIC). The optical chip includes a redirection component that receives an outgoing LIDAR signal from one of multiple different alternate waveguides. The LIDAR output signal includes light from the outgoing LIDAR signal. The redirection component is configured such that the direction that the LIDAR output signal travels away from the LIDAR system changes in response to changes in the alternate waveguide from which the redirection component receives the outgoing LIDAR signal.

In some instances, the optical chip includes an optical switch that electronics can operate so as to direct the outgoing LIDAR signal to different alternate waveguides. Accordingly, the LIDAR system can scan the LIDAR output signal to multiple different sample regions by operating the optical switch so as to change the alternate waveguide that provides the outgoing LIDAR signal to the redirection component. In some instances, the optical switch, the alternate waveguides, and the redirection component are all solid-state components (no moving parts). As a result, the optical chip can include a solid-state steering mechanism.

The steering mechanism can have reduced complexity and increased angular ranges compared to Optical Phased Arrays. Additionally, the steering mechanism can be adapted for use with output LIDAR signals that carry multiple channels and output multiple LIDAR output signals. As a result, the steering mechanism can be practical for use in many LIDAR applications.

Figure 1A:
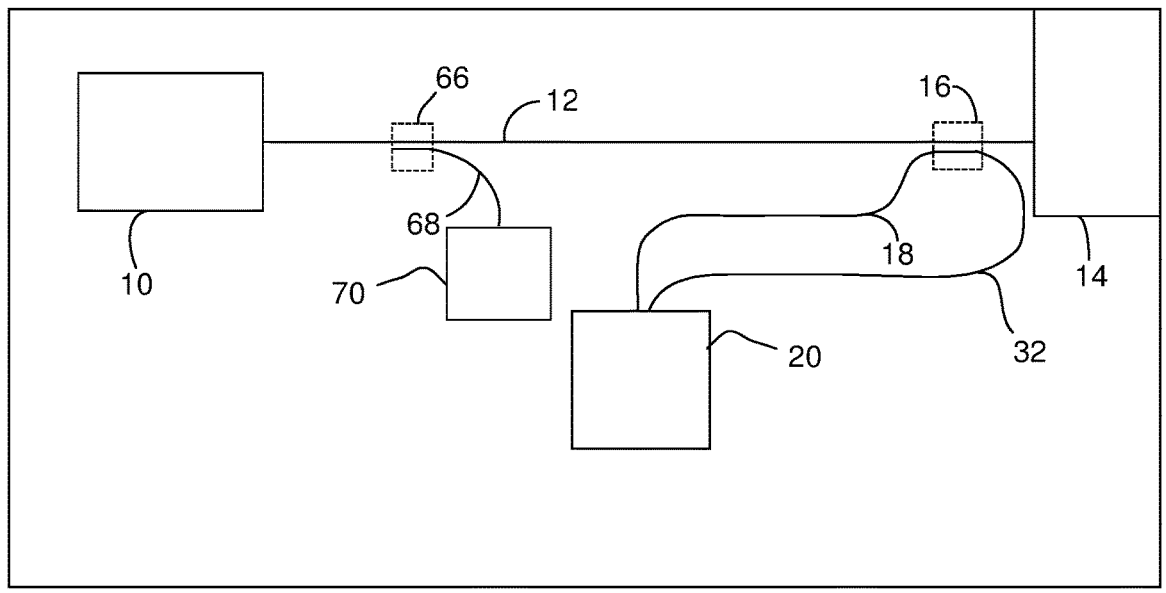
FIG. 1A is a topview of a LIDAR chip that includes an integrated mechanism for steering the direction that LIDAR output signals travel away from the LIDAR chip.
Figure 1A:

FIG. 1A is a topview of a LIDAR chip that includes a light source 10 that outputs an outgoing LIDAR signal. A suitable light source 10 includes, but is not limited to, semiconductor lasers such as External Cavity Lasers (ECLs), Distributed Feedback lasers (DFBs), Discrete Mode (DM) lasers and Distributed Bragg Reflector lasers (DBRs).

The LIDAR chip also includes a utility waveguide 12 that receives the outgoing LIDAR signal from the light source 10. The utility waveguide 12 terminates at an output component 14 and carries the outgoing LIDAR signal to the output component 14. The output component 14 can be positioned such that the outgoing LIDAR signal traveling through the output component 14 exits the chip and serves as a LIDAR output signal. For instance, the output component 14 can be positioned at an edge of the chip so the outgoing LIDAR signal traveling through the output component 14 exits the chip and serves as a LIDAR output signal.

The LIDAR output signal travels away from the chip and may be reflected by objects in the path of the LIDAR output signal. When the LIDAR output signal is reflected, at least a portion of the reflected light travels back toward the LIDAR chip as a LIDAR input signal. In some instances, the LIDAR input signals enters the utility waveguide 12 through the output component 14. The portion of the LIDAR input signal that enters the utility waveguide 12 serves as an incoming LIDAR signal.

The utility waveguide 12 carries the incoming LIDAR signal to a splitter 16 that moves a portion of the outgoing LIDAR signal from the utility waveguide 12 onto a comparative waveguide 18 as a comparative signal. The comparative waveguide 18 carries the comparative signal to a processing component 20 for further processing. Suitable splitters 16 include, but are not limited to, optical couplers, y-junctions, and MMIs.

The utility waveguide 12 also carrier the outgoing LIDAR signal to the splitter 16. The splitter 16 moves a portion of the outgoing LIDAR signal from the utility waveguide 12 onto a reference waveguide 32 as a reference signal. The reference waveguide 32 carries the reference signal to the processing component 20 for further processing.

As will be described in more detail below, the processing component 20 combines the comparative signal with the reference signal to form a composite signal that carries LIDAR data for a sample region on the field of view. Accordingly, the composite signal can be processed so as to extract LIDAR data (radial velocity and/or distance between a LIDAR system and an object external to the LIDAR system) for the sample region.

The LIDAR chip can include a control branch for controlling operation of the light source 10. The control branch includes a directional coupler 66 that moves a portion of the outgoing LIDAR signal from the utility waveguide 12 onto a control waveguide 68. The coupled portion of the outgoing LIDAR signal serves as a tapped signal. Although FIG. 1A illustrates a directional coupler 66 moving the portion of the outgoing LIDAR signal onto the control waveguide 68, other signal-tapping components can be used to move a portion of the outgoing LIDAR signal from the utility waveguide 12 onto the control waveguide 68. Examples of suitable signal tapping components include, but are not limited to, y-junctions, and MMIs.

The control waveguide 68 carries the tapped signal to control components 70. The control components can be in electrical communication with electronics 62. During operation, the electronics 62 can adjust the frequency of the outgoing LIDAR signal in response to output from the control components. An example of a suitable construction of control components is provided in U.S. patent application Ser. No. 15/977,957, filed on 11 May 2018, entitled "Optical Sensor Chip," and incorporated herein in its entirety.

Figure 1B:
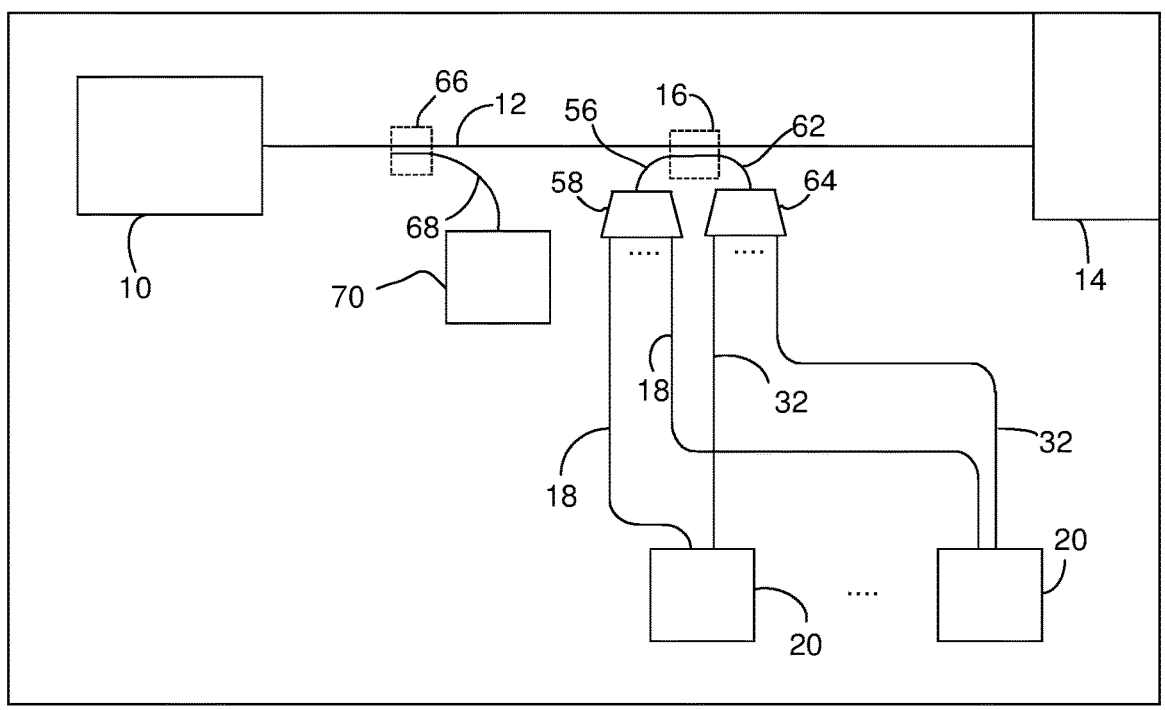
FIG. 1B is a topview of a LIDAR chip that includes an integrated mechanism for steering the direction that LIDAR output signals travel away from the LIDAR chip.
Figure 1B:
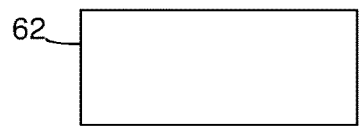

The LIDAR chip of FIG. 1A can be modified to output multiple LIDAR output signals that each carries a different channel. For instance, FIG. 1B is a topview of a LIDAR chip configured to output multiple LIDAR output signals that each carries a different channel. The light source 10 is configured to output an outgoing LIDAR signal that carries one or more different channels that are each at a different wavelength. The channels can be associated with a channel index j that extends from 1 to M. The wavelengths of the channels can be periodically spaced in that the wavelength increase from one channel to the next channel (the channel spacing) is constant or substantially constant. In some instances, the channels spacing is constant and greater than 0.5 nm, 1 nm, 3 nm, or 5 nm, and/or less than 10 nm, 15 nm, or 20 nm. In some instances, the number of channels, M, is greater than 2, 4 or 8 and/or less than 16, 32, or 64. A suitable light source 10 for generating multiple channels with periodically spaced wavelengths includes, but is not limited to, comb lasers and one or more single wavelength and/or one or more multiple wavelength lasers with outputs multiplexed into an outgoing LIDAR signal.

The utility waveguide 12 receives the outgoing LIDAR signal from the light source 10. The utility waveguide 12 terminates at an output component 14 and carries the outgoing LIDAR signal to the output component 14. Light from the outgoing LIDAR signal can exit one or more LIDAR elements selected from the group consisting of the LIDAR system, the LIDAR chip, and the output component through the output component 14. In some instances, the output component 14 has demultiplexing capability that separates the outgoing LIDAR signal into multiple LIDAR output signals that each exits from the LIDAR element through the output component 14. Each of the different LIDAR output signals carries a different one of the channels. In some instances, the output component 14 is positioned at an edge of the chip so the outgoing LIDAR signal travels through the output component 14 and exits the chip as multiple LIDAR output signals.

The LIDAR output signals travel away from the LIDAR chip. Each LIDAR output signal can be reflected by one or more objects in their path. When a LIDAR output signal is reflected, at least a portion of the light from the reflected signal returns to the output component 14 as a LIDAR input signal. Different LIDAR input signals each carry a different one of the channels. The output component 14 combines the different LIDAR input signals into an incoming LIDAR signal that is received on the utility waveguide 12.

The utility waveguide 12 also carries the incoming LIDAR signal to a splitter 16 that moves a portion of the outgoing LIDAR signal from the utility waveguide 12 onto a common comparative waveguide 56 as a common comparative signal. The common comparative waveguide 56 carries the common comparative signal to a comparative demultiplexer 58. When the common comparative signal carries multiple channels, the comparative demultiplexer 30 divides the common comparative signal into different comparative signals that each carries a different one of the channels. The comparative demultiplexer 58 outputs the comparative signals on different comparative waveguides 18. The comparative waveguides 18 each carry one of the comparative signals to a different processing component 20.

The utility waveguide 12 also carries the outgoing LIDAR signal to the splitter 16. The splitter 16 moves a portion of the outgoing LIDAR signal from the utility waveguide 12 onto a common reference waveguide 62 as a common reference signal. The reference waveguide 62 carries the reference light signal to a reference demultiplexer 64. When the common reference light signal includes multiple channels, the reference demultiplexer 64 divides the common reference light signal into different reference signals that each carries a different one of the channels. The reference demultiplexer 64 outputs the reference signals on different reference waveguides 32. The reference waveguides 32 each carry one of the reference signals to a different one of the processing components 20.

The comparative waveguides 18 and the reference waveguides 32 are configured such that a comparative signal and the corresponding reference signal are received at the same processing component 20. For instance, the comparative waveguides 18 and the reference waveguides 32 are configured such that the comparative signal and the corresponding reference signal of the same wavelength and/or carrying the same channel are received at the same processing component 20. Accordingly, each processing component 20 receives the comparative signal and the reference signal carrying the same channel.

As will be described in more detail below, the processing components 20 each combines a comparative signal with the corresponding reference signal to form a composite signal that carries LIDAR data for a sample region on the field of view. Accordingly, the composite signal can be processed so as to extract LIDAR data (radial velocity and/or distance between a LIDAR system and an object external to the LIDAR system) for the sample region.

The LIDAR chip can include a control branch for controlling operation of the light source 10. The control branch 48 includes a directional coupler 66 that moves a portion of the outgoing LIDAR signal from the utility waveguide 12 onto a control waveguide 68. The coupled portion of the outgoing LIDAR signal serves as a tapped signal. Although FIG. 1B illustrates a directional coupler 66 moving the portion of the outgoing LIDAR signal onto the control waveguide 68, other signal-tapping components can be used to move a portion of the outgoing LIDAR signal from the utility waveguide 12 onto the control waveguide 68. Examples of suitable signal tapping components include, but are not limited to, y-junctions, and MMIs.

The control waveguide 68 carries the tapped signal to control components 70. The control components can be in electrical communication with electronics 62. During operation, the electronics 62 can adjust the frequency of the outgoing LIDAR signal in response to output from the control components. An example of a suitable construction of control components is provided in U.S. patent application Ser. No. 15/977,957, filed on 11 May 2018, entitled "Optical Sensor Chip," and incorporated herein in its entirety.

Suitable electronics 62 can include, but are not limited to, a controller that includes or consists of analog electrical circuits, digital electrical circuits, processors, microprocessors, digital signal processors (DSPs), Field Programmable Gate Arrays (FPGAs), computers, microcomputers, or combinations suitable for performing the operation, monitoring and control functions described above. In some instances, the controller has access to a memory that includes instructions to be executed by the controller during performance of the operation, control and monitoring functions. Although the electronics are illustrated as a single component in a single location, the electronics can include multiple different components that are independent of one another and/or placed in different locations. Additionally, as noted above, all or a portion of the disclosed electronics can be included on the chip including electronics that are integrated with the chip.

Although the light source 10 is shown in FIG. 1A and FIG. 1B as being positioned on the LIDAR chip, all or a portion of the light source 10 can be located off the LIDAR chip.

Figure 2A:
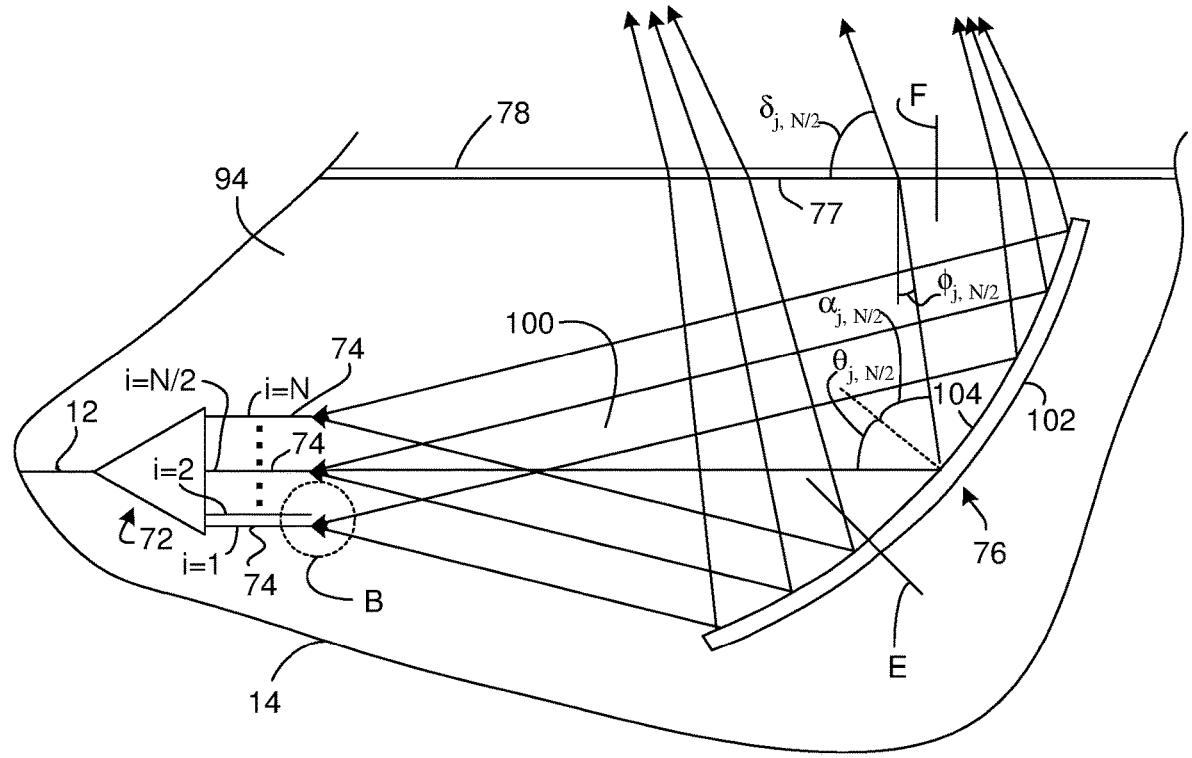
FIG. 2A through FIG. 2F illustrate an example of a suitable output component for use with the LIDAR chip of FIG. 1A and/or FIG. 1B.
Figure 2B:
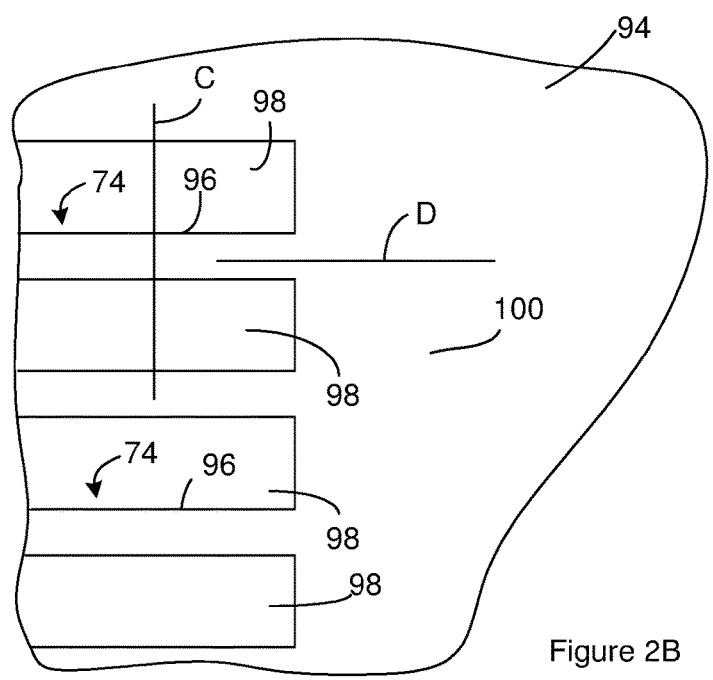
Figure 2C:
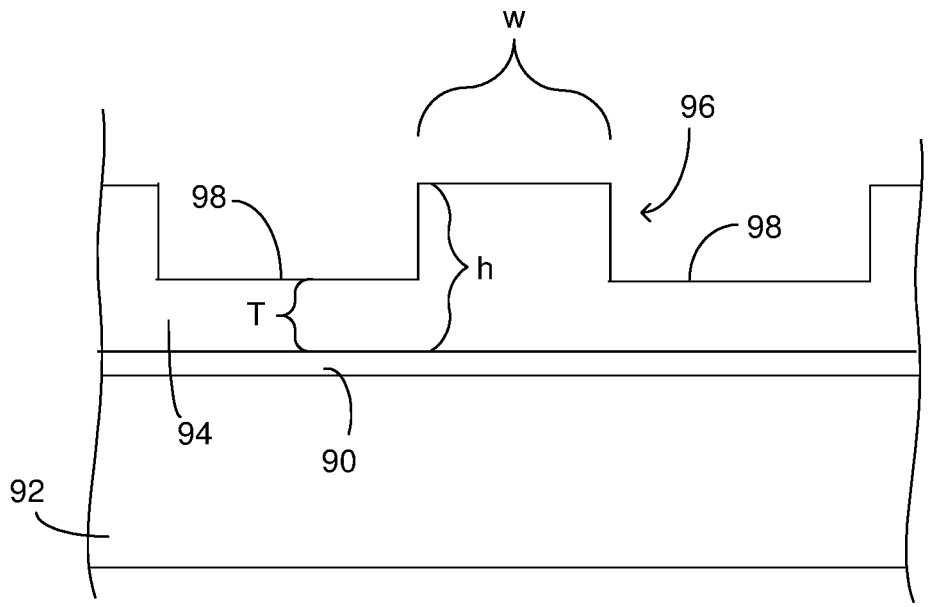
Figure 2D:
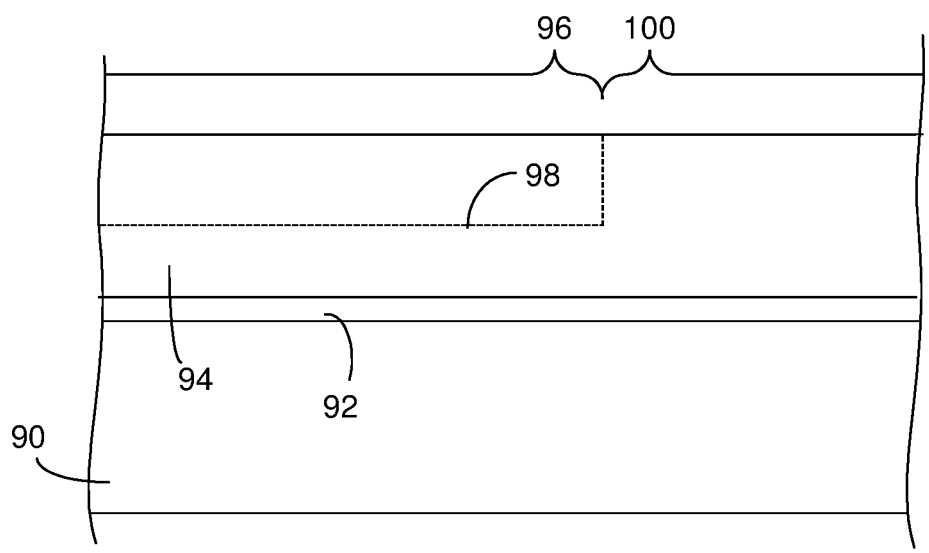
Figure 2E:
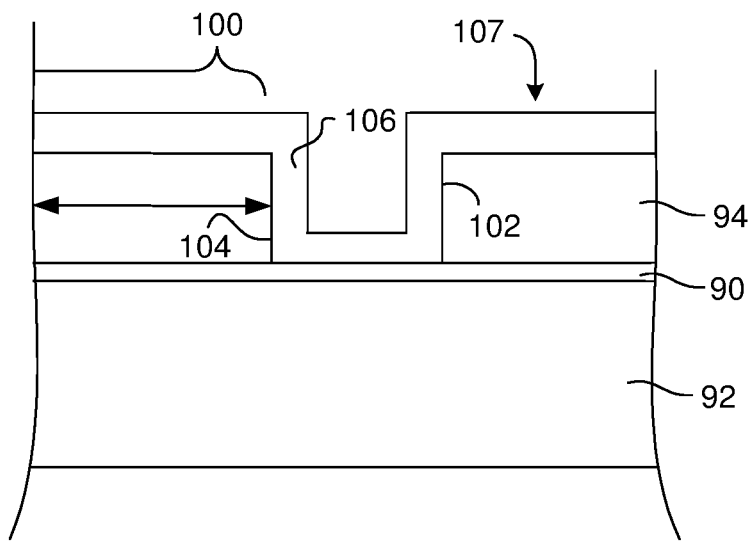
Figure 2F:
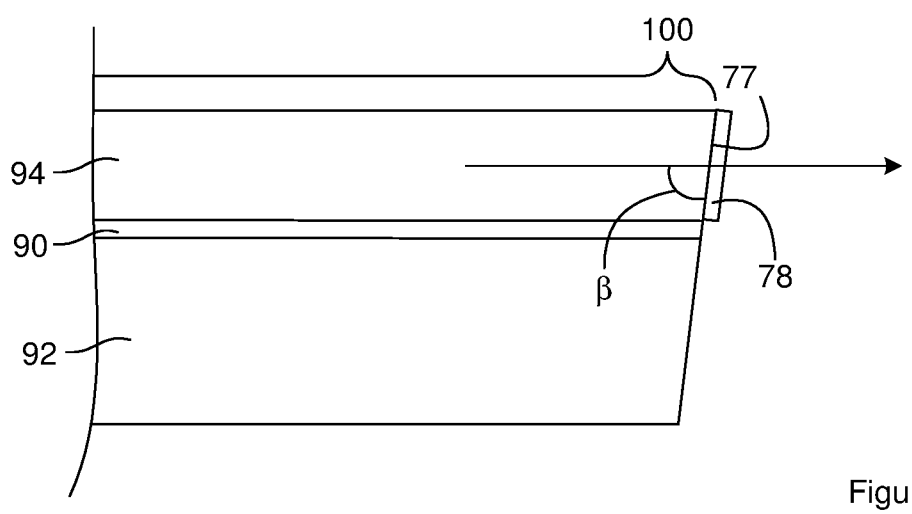

FIG. 2A through FIG. 2F illustrate an example of a suitable output component 14 for use with the LIDAR chip of FIG. 1A and FIG. 1B. FIG. 2A is schematic of a topview of the output component. FIG. 2B is a close-up of the portion of the output component encircled by the dashed line labeled B in FIG. 2A. FIG. 2C is a cross section of the output component taken along the line labeled C in FIG. 2B. FIG. 2D is a cross section of the output component taken along the line labeled D in FIG. 2B. FIG. 2E is a cross section of the output component taken along the line labeled E in FIG. 2A. FIG. 2F is a cross section of the output component taken along the line labeled F in FIG. 2A.

The output component includes an optical switch 72 that receives the outgoing LIDAR signal from the utility waveguide 12. The optical switch 72 is configured to direct the outgoing LIDAR signal to any one of N different alternate waveguides 74. In FIG. 2A, the alternate waveguides are each labeled with an alternate waveguide index i with integer values from 1 to N. Suitable values of N include, but are not limited to, values less than 128, 64, or 32 and/or greater than 4, 8, or 16.

The output component includes a redirection component 76 that receives the outgoing LIDAR signal from any one of the alternate waveguides 74. The redirection component 76 also redirects the received outgoing LIDAR signal such that the direction that the outgoing LIDAR signal travels away from the redirection component 76 changes in response to changes in the alternate waveguide 74 from which the redirection component 76 receives the outgoing LIDAR signal. The portion of the outgoing LIDAR signal traveling away from the redirection component 76 serves as an output signal.

The output component includes a facet 77 that receives the output signal from the redirection component 76. The output signal can exit the LIDAR system through the facet. The portion of the output signal that exits the LIDAR system through the facet can serve as the LIDAR output signal. The facet can optionally include an anti-reflective coating 78. Suitable anti-reflective coatings 78 include, but are not limited to, single layer dielectric coatings such as silicon nitride, multi-layer dielectric coatings including silica, hafnium oxide, and aluminum oxide.

As noted above, the LIDAR output signal can be reflected by one or more objects located outside of the LIDAR system and at least a portion of the reflected light travels back toward the LIDAR system as a LIDAR input signal. The output component can receive the LIDAR input signal. For instance, the LIDAR input signal can enter the LIDAR system through the facet. The portion of the LIDAR input signal that enters the LIDAR system can serve as the input signal. The redirection component 76 receives the input signal through the facet and outputs an incoming LIDAR signal. The redirection component 76 directs the incoming LIDAR signal to one of the alternate waveguides 74. The optical switch 72 receives the incoming LIDAR signal from the alternate waveguide 74 and the optical switch 72 directs the incoming LIDAR signal the utility waveguide 12.

Suitable platforms for the output component include, but are not limited to, silica, indium phosphide, and silicon-on-insulator wafers. FIG. 2B through FIG. 2F illustrate different portions of the output component constructed from a silicon-on-insulator wafer. A silicon-on-insulator (SOI) wafer includes a buried layer 90 between a substrate 92 and a light-transmitting medium 94. In a silicon-on-insulator wafer, the buried layer 90 is silica while the substrate and the light-transmitting medium 94 are silicon. The substrate of an optical platform such as an SOI wafer can serve as the base for the output component. For instance, the optical components shown in FIG. 1A and/or FIG. 1B can be positioned on or over the top and/or lateral sides of the same substrate.

The portion of the chip illustrated in FIG. 2B through FIG. 2F includes a waveguide construction that is suitable for use with chips constructed from silicon-on-insulator wafers. A ridge 96 of the light-transmitting medium 94 extends away from slab regions 98 of the light-transmitting medium 94. The light signals are constrained between the top of the ridge and the buried layer 90. As a result, the ridge 96 at least partially defines the waveguide.

The dimensions of the ridge waveguide are labeled in FIG. 2C. For instance, the ridge has a width labeled w and a height labeled h. A thickness of the slab regions is labeled T. For LIDAR applications, these dimensions can be more important than other applications because of the need to use higher levels of optical power than are used in other applications. The ridge width (labeled w) is greater than 1 µm and less than 4 µm, the ridge height (labeled h) is greater than 1 µm and less than 4 µm, the slab region thickness is greater than 0.5 µm and less than 3 µm. These dimensions can apply to straight or substantially straight portions of the waveguide, curved portions of the waveguide and tapered portions of the waveguide(s). Accordingly, these portions of the waveguide will be single mode. However, in some instances, these dimensions apply to straight or substantially straight portions of a waveguide. Additionally or alternatively, curved portions of a waveguide can have a reduced slab thickness in order to reduce optical loss in the curved portions of the waveguide. For instance, a curved portion of a waveguide can have a ridge that extends away from a slab region with a thickness greater than or equal to 0.0 µm and less than 0.5 µm. While the above dimensions will generally provide the straight or substantially straight portions of a waveguide with a single-mode construction, they can result in the tapered section(s) and/or curved section(s) that are multi-mode. Coupling between the multi-mode geometry to the single mode geometry can be done using tapers that do not substantially excite the higher order modes. Accordingly, the waveguides can be constructed such that the signals carried in the waveguides are carried in a single mode even when carried in waveguide sections having multi-mode dimensions. The waveguide construction of FIG. 2C is suitable for all or a portion of the waveguides on a LIDAR chip constructed according to FIG. 1A and/or FIG. 1B.

The outgoing LIDAR signal and/or the incoming LIDAR travel through a partial free space region 100 between the alternate waveguides 74 and the redirection component 76 and/or between the redirection component 76 and the facet. The partial free space region 100 is free space in the horizontal direction but guided in the vertical direction. As a result, the outgoing LIDAR signal and/or the incoming LIDAR can contract or expand horizontally when traveling through the partial free space region 100.

A portion of the free space region 100 can terminate at the facet 77 as is evident from FIG. 2F. The facet 77 can be at an angle β measured in a direction that is perpendicular to a plane of the LIDAR chip and relative to a direction of propagation of the LIDAR output signal(s) in the free space region at the facet 77. The plane of the LIDAR chip can be an upper surface of a substrate such as the substrate 92 of FIG. 2A through FIG. 2C. The angle β can be less than 90° in order to reduce the effects of back reflection on the LIDAR output signal(s). Suitable values for the angle β include angles less than or equal to 12°, 10°, or 8° and/or greater than or equal to 7°, 6°, or 5°.

The illustrated redirection component 76 includes a recess 102 that extends partially or fully through the light-transmitting medium 94. Although the illustrated recess 102 does not extend into the buried layer 90, the illustrated recess 102 can extend into or through buried layer 90. A surface of the recess 102 serves as a return surface 104. The return surface 104 is configured such that at least a portion of the outgoing LIDAR signal or the input signal that is incident on the return surface 104 from the light-transmitting medium 94 returns to the light-transmitting medium 94. The mechanism by which the return occurs can be reflection at or by the return surface 104. For instance, a recess medium 106 can be positioned in the recess 102 and in contact with the return surface 104. The recess medium 106 can fill the recess 102 or be a layer of material that contacts the return surface 104. The recess medium 106 can be a fluid or a solid. As shown in FIG. 2E, the recess medium 106 can be a solid that also serves as a cladding 107 for the output component. In some instances, the recess medium 106 has a lower index of refraction than the light-transmitting medium 94 to cause reflection at the return surface 104. Suitable recess media with an index of refraction lower than the light-transmitting medium 94 include, but are not limited to, air, epoxies, silicon dioxide, and silicon nitride. Suitable recess media with an index of refraction lower than the light-transmitting medium 94 that can also serve as cladding include, but are not limited to, silicon dioxide, and silicon nitride.

Figure 2G:
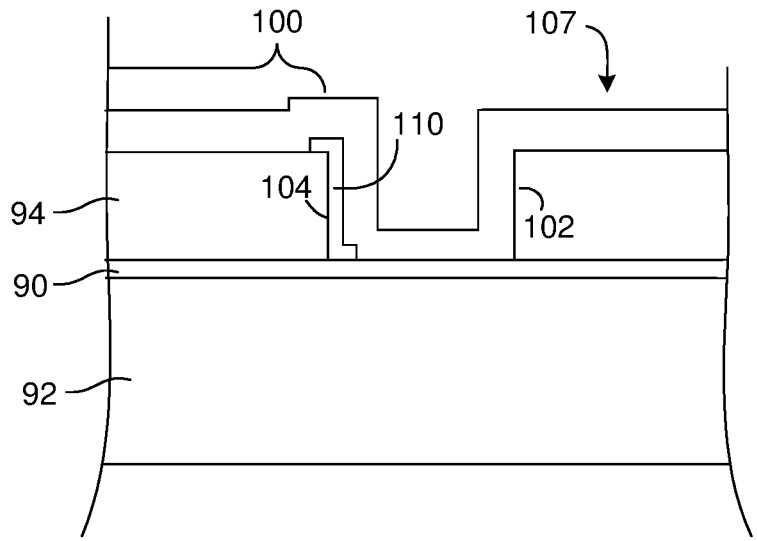
FIG. 2G is an alternate cross section of the output component taken along the line labeled E in FIG. 2A.

In some instances, the recess medium 106 is a medium that causes the outgoing LIDAR signal or input signal to be reflected at the return surface 104. For instance, the recess medium 106 can be a reflective material 110 that contacts the return surface 104. FIG. 2G illustrates a layer of reflective material 110 in contact with the return surface 104. Although FIG. 2G illustrates a cladding positioned on the output component such that the cladding is located over the recess medium 106 and extends into the recess 102, the cladding is optional. Suitable reflective materials 110 include, but are not limited to, multi-layer dielectric films including silicon dioxide, hafnium oxide and aluminum oxide, and metals such as aluminum, nickel, and gold. Suitable claddings include, but are not limited to, silicon dioxide, silicon nitride, and aluminum oxide.

The redirection component 76 and the return surface 104 are arranged such that an incident angle of the outgoing LIDAR signal on the redirection component is a function of the alternate waveguide from which the redirection component receives the outgoing LIDAR signal. As a result, the angle of incidence of the outgoing LIDAR signal on the return surface 104 changes in response to changes in the alternate waveguide 74 from which the outgoing LIDAR signal exits. For instance, in one example, the alternate waveguides 74 can be parallel and the return surface 104 can be curved. In one example, the return surface 104 is parabolic or spherical. A parabolic or spherical return surface can provide collimation or focusing of the outgoing LIDAR signal. A parabolic return surface may provide a tighter focus than a spherical return surface. Since the incident angle changes in response to changes in the alternate waveguide 74, changing the alternate waveguide 74 that receives the outgoing LIDAR signal from the optical switch 72 changes the direction that the output signal travels away from the redirection component 76. To illustrate this, $\theta_i$ can represent the angle of incidence for the outgoing LIDAR signal from alternate waveguide 74 i on the return surface 104 and $\alpha_{j,\ i}$ can represent the angular direction that the output signal carrying channel j and exiting from alternate waveguide 74 i (the angle of reflection) travels away from the redirection component 76. When the outgoing LIDAR signal carries a single channel, the value of j is a constant and can have a value of 1. When the outgoing LIDAR signal does not have demultiplexing functionality, the value of $\alpha_{j,\ i}$ can be constant for different channels exiting from the same alternate waveguide 74 i.

FIG. 2A labels the angle of incidence for alternate waveguide 74 N/2 ($\theta_{j,\ N/2}$) and the angular direction that the resulting output LIDAR signal travels away from alternate waveguide 74 N/2 ($\alpha_{j,\ N/2}$). The value of both $\theta_i$ and $\alpha_{j,i}$ changes as the value of the alternate waveguide 74 index i changes from N/2 to another value. As a result, the electronics can operate the optical switch 72 to select the alternate waveguide 74 that provides the output signal with the desired direction ($\alpha_{j,i}$).

The orientation of the redirection component 76 relative to the facet produces an angle of incidence for the output signal carrying channel j on the facet ($\phi_{j,\ i}$) that changes as the alternate waveguide 74 changes. For instance, FIG. 2A labels the angle of incidence of the output LIDAR signal carrying channel j on the facet ($\phi_{j,\ i}$) for alternate waveguide 74 N/2 as $\phi_{j,\ N/2}$. The LIDAR output signal carrying channel j travels away from the output component in an angular direction ($\delta_{j,\ i}$) that changes as the alternate waveguide 74 changes. For instance, FIG. 2A labels the angular direction of the LIDAR output signal carrying channel j relative to the facet ($\delta_{j,\ i}$) for alternate waveguide 74 N/2 as $\delta_{j,\ N/2}$. The value of both $\delta_{j,\ i}$ and $\phi_{j,\ i}$ changes as the value of the alternate waveguide 74 index i changes from N/2 to another value. As a result, the electronics can tune the direction that the LIDAR output signal travels away from one or more LIDAR elements selected from the group consisting of the LIDAR system, the LIDAR chip, and the output component by operating the optical switch 72 to select the alternate waveguide 74 that provides the LIDAR output signal with the angular direction ($\delta_{j,\ i}$) that is desired for the LIDAR output signal to travel away from the LIDAR element.

In some instances, the LIDAR system is constructed to have one, two, or three conditions selected from the group consisting of: an angle of incidence ($\theta_i$) for at least one, two, three, four, or all of the alternate waveguides 74 greater than 10°, 25°, or 30° and/or less than 40°, 50°, or 60°; an angle of incidence ($\phi_{j,\ i}$) for at least one, two, three, four, or all of the alternate waveguides 74 greater than 0°, 2°, or 5° and/or less than 10°, 15°, or 30°; and an angular direction ($\delta_{j,\ i}$) for at least one, two, three, four, or all of the alternate waveguides 74 greater than 10°, 25°, or 50° and/or less than 60°, 75°, or 90°.

The use of a reflective material 110 disclosed in the context of FIG. 2G can become more desirable as the number (M*N) of angles of incidences ($\phi_{j,\ i}$, for all values of i and j) that fall below the critical angle for total internal reflection ($\phi_c$) increases. In some instances, all or a portion of the M*N angles of incidences ($\phi_{j,\ i}$) for all values of i and j fall below the critical angle for total internal reflection ($\phi_c$) and the recess medium 106 is a reflective material 110 such as a metal. In some instances, none of the M*N angles of incidences ($\phi_{j,\ i}$) for all values of i and j falls below the critical angle for total internal reflection ($\phi_c$) and the recess medium 106 is a light-transmitting material with an index of refraction below the light-transmitting medium.

Figure 3A:
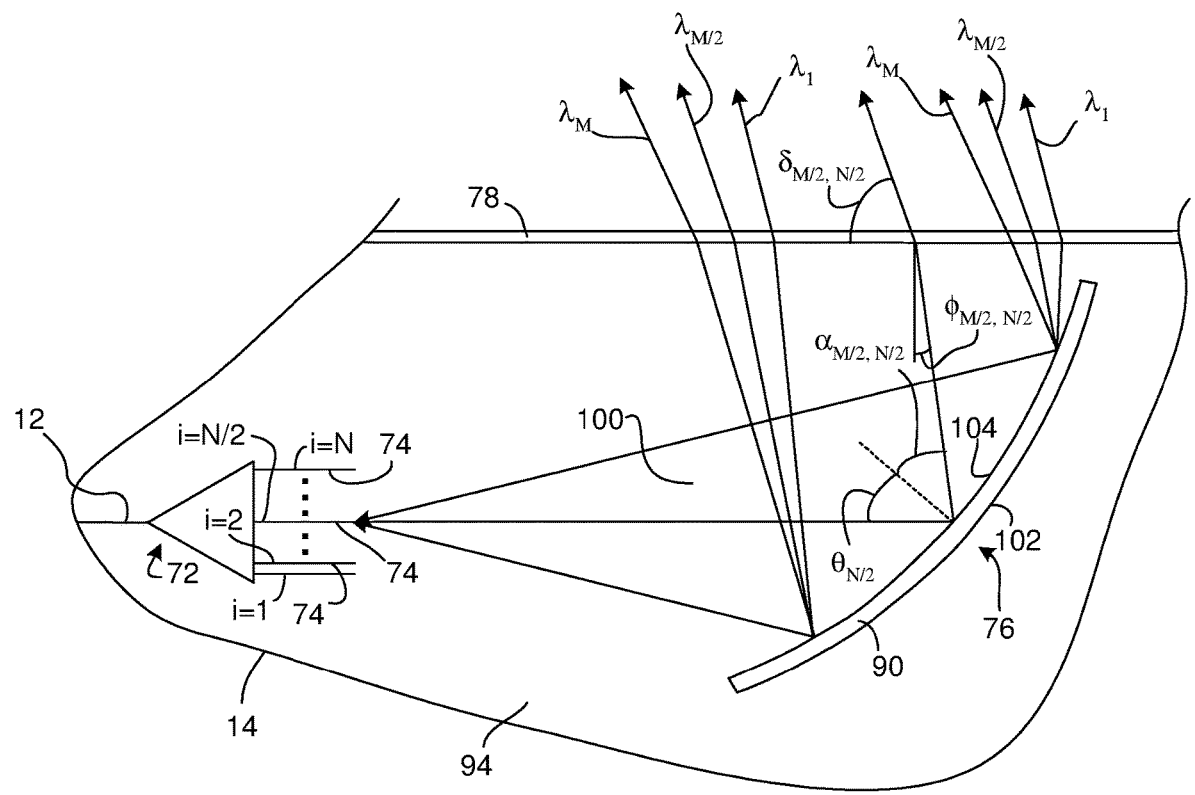
FIG. 3A through FIG. 3B illustrate the output component of FIG. 2A modified to include a redirection component.

The output component can be configured to provide demultiplexing functionality by modifying the return surface 104 to provide wavelength dispersion. For instance, the return surface 104 can be configured as an optical grating. FIG. 3A illustrate the return component of FIG. 2A modified such that the return surface 104 acts an optical grating. An outgoing LIDAR signal carrying M different channels is shown exiting from the alternate waveguide 74 with alternate waveguide 74 index N/2. The outgoing LIDAR signal is received by the redirection component 76. Because the return surface 104 of the redirection component 76 is configured to provide wavelength dispersion, the return surface 104 divides the outgoing LIDAR signal into multiple output signals that each carries a different one of the channels. The different output signals have different angles of incidence ($\phi_{j,\ N/2}$) relative to the facet.

The output signals can exit the output component through the facet. The portion of each output signal that exits the output component through the facet serves as a LIDAR output signal. The LIDAR output signals carry different channels labeled $\lambda_i$ through $\lambda_M$ in FIG. 3A. The LIDAR output signals travel different angular directions ($\delta_{j,\ N/2}$) away from one or more LIDAR elements in different directions where the one or more LIDAR elements are selected from the group consisting of the LIDAR system, the LIDAR chip, and the output component. Since the direction of each of the illustrated LIDAR output signals changes in response to changes in the alternate waveguide 74, the electronics can concurrently tune the direction of the different LIDAR signals by changing the alternate waveguide 74 from which the outgoing LIDAR signal exits.

The LIDAR output signals can each be reflected by one or more objects located outside of the LIDAR system. At least a portion of the reflected light travels back toward the LIDAR system as a LIDAR input signal. Different LIDAR input signals each carry a different one of the channels. The output component can receive the LIDAR input signals. For instance, the LIDAR input signals can enter the LIDAR system through the facet. The portion of each LIDAR input signal that enters the LIDAR system serves as an input signal. The redirection component 76 receives the input signals and outputs the incoming LIDAR signal. The redirection component 76 directs the incoming LIDAR signal to one of the alternate waveguides 74. The optical switch 72 receives the incoming LIDAR signal from the alternate waveguide 74 and the optical switch 72 directs the incoming LIDAR signal the utility waveguide 12.

In some instances, the LIDAR system is constructed to have one, two, or three conditions selected from the group consisting of: an angle of incidence ($\theta_i$) for at least one, two, three, four, or all of the alternate waveguides 74 greater than 10°, 25°, or 30° and/or less than 40°, 50°, or 60°; an angle of incidence ($\phi_{j,\ i}$) for at least one, two, three, four, or all of the alternate waveguides 74 greater than 0°, 2°, or 5° and/or less than 10°, 15°, or 30°; and an angular direction ($\delta_{j,\ i}$) for at least one, two, three, four, or all of the alternate waveguides 74 greater than 10°, 25°, or 50° and/or less than 60°, 75°, or 90°.

Figure 3B:
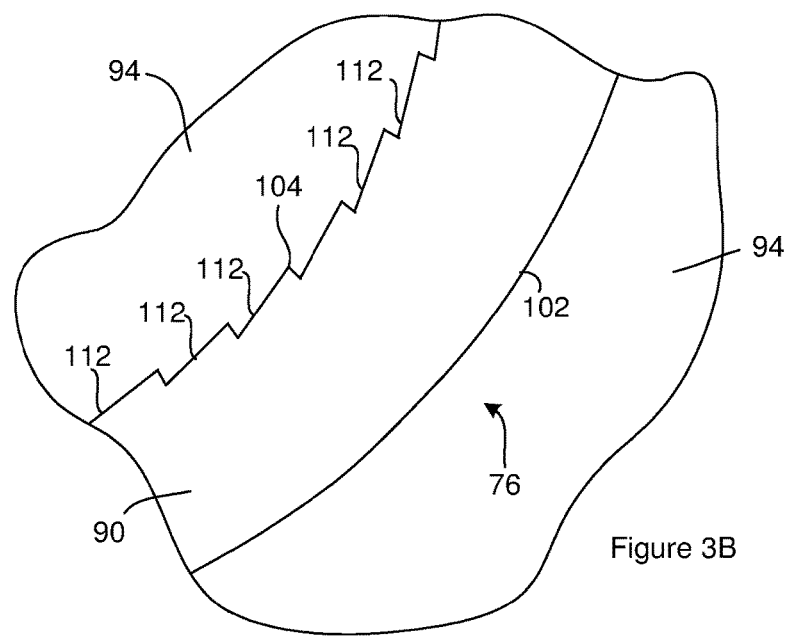

Suitable optical gratings for the redirection component 76 include, but are not limited to, an echelle grating. As an example, FIG. 3B is a topview of the return component of FIG. 2A modified such that the return surface 104 acts an optical grating. The return surface 104 includes multiple grooves 112. The grooves 112 can be arranged as an optical grating such as an echelle grating. Suitable groove 112 structures include, but are not limited to, steps.

Figure 4A:
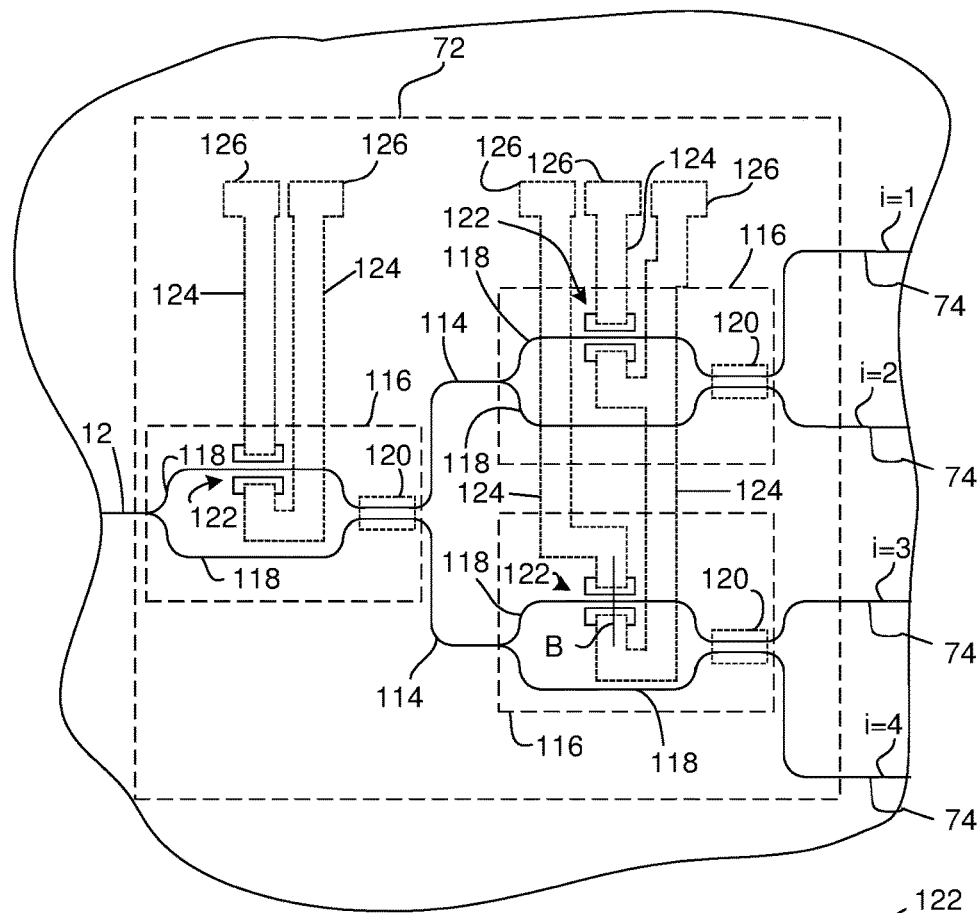
FIG. 4A and FIG. 4B illustrate an example of an optical switch that includes cascaded Mach-Zehnder interferometers.
Figure 4B:
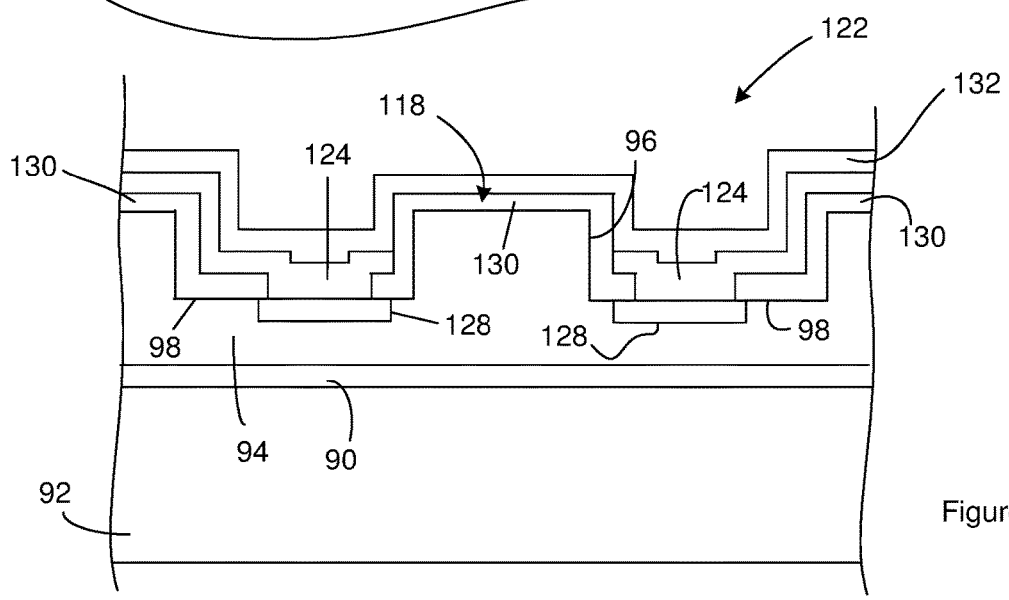

Suitable optical switches 72 for use with the output component include, but are not limited to, cascaded Mach-Zehnder interferometers and micro-ring resonator switches. In one example, the optical switch 72 includes cascaded Mach-Zehnder interferometers that use thermal or free-carrier injection phase shifters. FIG. 4A and FIG. 4B illustrate an example of an optical switch 72 that includes cascaded Mach-Zehnder interferometers 116. FIG. 4A is a topview of the optical switch 72. FIG. 4B is a cross section of the optical switch 72 shown in FIG. 4A taken along the line labeled B in FIG. 4A.

The optical switch 72 receives the outgoing LIDAR signal from the utility waveguide 12. The optical switch 72 is configured to direct the outgoing LIDAR signal to one of several alternate waveguides 74. The optical switch 72 includes interconnect waveguides 114 that connect multiple Mach-Zehnder interferometers 116 in a cascading arrangement. Each of the Mach-Zehnder interferometers 116 directs the outgoing LIDAR signal to one of two interconnect waveguides 114. The electronics can operate each Mach-Zehnder so as to select which of the two interconnect waveguides 114 receives the outgoing LIDAR signal from the Mach-Zehnder interferometer 116. The interconnect waveguides 114 that receive the outgoing LIDAR signal can be selected such that the outgoing LIDAR signal is guided through the optical switch 72 to a particular one of the alternate waveguides 74.

Each of the Mach-Zehnder interferometers 116 includes two branch waveguides 118 that each receives a portion of the outgoing LIDAR signal from the utility waveguide 12 or from an interconnect waveguide 114. Each of the Mach-Zehnder interferometers 116 includes a direction component 120 that receives two portions of the outgoing LIDAR signal from the branch waveguides 118. The direction component 120 steers the outgoing LIDAR signal to one of the two interconnect waveguides 114 configured to receive the outgoing LIDAR signal from the direction component 120. The interconnect waveguide 114 to which the outgoing LIDAR signal is directed is a function of the phase differential between the two different portions of the outgoing LIDAR signal received by the direction component 120. Although FIG. 4A illustrates a directional coupler operating as the direction component 120, other direction components 120 can be used. Suitable alternate direction components 120 include, but are not limited to, Multi-Mode Interference (MIMI) devices and tapered couplers.

Each of the Mach-Zehnder interferometers 116 includes a phase shifter 122 positioned along one of the branch waveguides 118. The output component includes conductors 124 in electrical communication with the phase shifters 122. The conductors 124 are illustrated as dashed lines so they can be easily distinguished from underlying features. The conductors 124 each terminate at a contact pad 126. The contact pads 126 can be used to provide electrical communication between the conductors 124 and the electronics. Accordingly, the conductors 124 provide electrical communication between the electronics and the phase shifters 122 and allow the electronics to operate the phase shifters 122. Suitable conductors 124 include, but are not limited to, metal traces. Suitable materials for the conductors include, but are not limited to, titanium, aluminum and gold.

The electronics can operate each of the phase shifters 122 so as to control the phase differential between the portions of the outgoing LIDAR signal received by a direction component 120. In one example, a phase shifter 122 can be operated so as to change the index of refraction of a portion of at least a portion of a branch waveguide 118. Changing the index of a portion of a branch waveguide 118 in a Mach-Zehnder interferometer 116, changes the effective length of that branch waveguides 118 and accordingly changes the phase differential between the portions of the outgoing LIDAR signal received by a direction component 120. The ability of the electronics to change the phase differential allows the electronics to select the interconnect waveguide 114 that receives the outgoing LIDAR signal from the direction component 120.

FIG. 4B illustrates one example of a suitable construction of a phase shifter 122 on a branch waveguide 118. The branch waveguide 118 is at least partially defined by a ridge 96 of the light-transmitting medium 94 that extends away from slab regions 98 of the light-transmitting medium 94. Doped regions 128 extend into the slab regions 98 with one of the doped regions including an n-type dopant and one of the doped regions 128 including a p-type dopant. A first cladding 130 is positioned between the light-transmitting medium 94 and a conductor 124. The conductors 124 each extend through an opening in the first cladding 130 into contact with one of the doped regions 128. A second cladding 132 is optionally positioned over the first cladding 130 and over the conductor 124. The electronics can apply a forward bias can be applied to the conductors 124 so as to generate an electrical current through the branch waveguide 118. The resulting injection of carriers into the branch waveguide 118 causes free carrier absorption that changes the index of refraction in the branch waveguide 118.

The first cladding 130 and/or the second cladding 132 illustrated in FIG. 4B can each represent one or more layers of materials. The materials for the first cladding 130 and/or the second cladding 132 can be selected to provide electrical isolation of the conductors 124, lower index of refraction relative to the light-transmitting medium 94, stress reduction and mechanical and environmental protection. Suitable materials for the first cladding 130 and/or the second cladding 132 include, but are not limited to, silicon nitride, tetraorthosilicate (TEOS), silicon dioxide, silicon nitride, and aluminum oxide. The one or more materials for the first cladding 130 and/or the second cladding 132 can be doped or undoped.

In some instances, the cladding 107 shown in FIG. 2E and FIG. 2G represents the first cladding 130 or a combination of the first cladding 130 and the second cladding 132. In many applications, the cladding 107 and the second cladding 132 are optional. The first cladding 130, the second cladding 132, and the cladding 107 are not shown in many of the above illustrations such as FIG. 2A through FIG. 2C, FIG. 2E, FIG. 3A through FIG. 3B and FIG. 4A to simplify these illustrations; however, one or more of these claddings can be present on all or a portion of the illustrated LIDAR chips.

The components of the output component can be integrated on the same optical chip. For instance, the components of the output component can be positioned over the same substrate. As an example, an optical chip can include a substrate such as the substrate 92 of FIG. 2C through FIG. 2G and FIG. 4B and the optical chip can include the optical switch, alternate waveguides, free space region, and redirection component on the substrate 92. Additionally or alternately, multiple components of the output component can include light-transmitting medium 94 from the same continuous layer of light-transmitting medium 94. As an example, the output component can include two, three, four or more conditions, or all conditions, selected from the group consisting of: the optical switch 72 guiding the outgoing light signal through a light-transmitting medium 94; the branch waveguides 118 guiding the outgoing light signal through the light-transmitting medium 94; the interconnect waveguides 114 guiding the outgoing light signal through the light-transmitting medium 94; the alternate waveguides 74 guiding the outgoing light signal through the light-transmitting medium 94; the phase shifters 122 guiding the outgoing light signal through the light-transmitting medium 94; free space region 100 being arranged such that the outgoing light signal travels through the light-transmitting medium 94 when traveling through the free space region 100; the return surface 104 being a surface of the light-transmitting medium 94; and the recess being a recess 102 in the light-transmitting medium 94 where the light-transmitting medium 94 in each condition is part of the same continuous layer of the light-transmitting medium 94. Additionally, in some instances, at least a portion of the utility waveguide 12 guides the outgoing light signal through light-transmitting medium 94 that is also a part of the same continuous layer of the light-transmitting medium 94. As an example, the branch waveguides 118, the interconnect waveguides 114, the alternate waveguides 74 can be constructed according to FIG. 2C, the phase shifters 122 can be constructed according to FIG. 4B, the free space region 100 can be constructed according to FIG. 2D, and FIG. 2E or FIG. 2G, the recess 102 and/or return surface 104 can be constructed according to FIG. 2E or FIG. 2G or FIG. 3B. Additionally, the output component can be constructed to have the light-transmitting medium 94 shown in one, two, more than three or all of the images selected from the group consisting of FIG. 2C through FIG. 2E, FIG. 2G, FIG. 3B and FIG. 4B represent different parts of the same continuous layer of light-transmitting medium 94. The branch waveguides 118, interconnect waveguides 114, alternate waveguides 74, phase shifters 122, free space region 100, and return component can be constructed using integrated circuit manufacturing technologies including, but not limited to, photolithography, masking, etching, ion implantation, and deposition.

The steering of the direction of the one or more LIDAR output signals provided by the output component is in a plane or substantially within the plane. However, in many applications, it is desirable to steer the LIDAR output signals to sample regions arranged in three dimensions. The above LIDAR chip construction is suitable for use with various scanning mechanisms. For instance, the one or more LIDAR output signals can be received by one or more reflecting devices 134 and/or one more collimating devices 136. The one or more reflecting devices 134 can be configured to re-direct and/or steer the LIDAR output signal so as to provide scanning of the LIDAR output signal. Suitable reflecting devices 134 include, but are not limited to, mirrors such as mechanically driven mirrors and Micro Electro Mechanical System (MEMS) mirrors. Suitable collimating devices 136 include, but are not limited to, individual lenses and compound lenses.

Figure 5A:
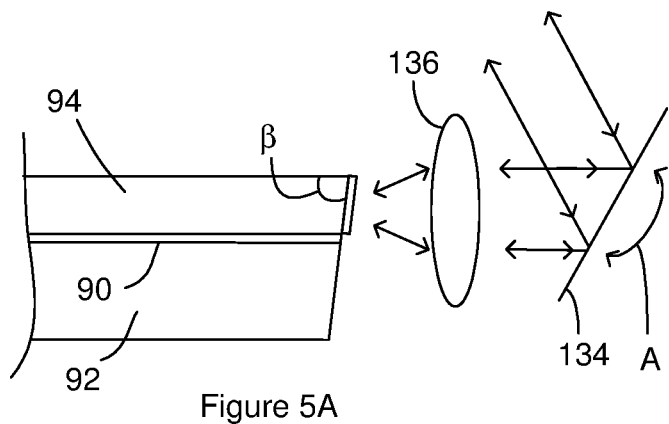
FIG. 5A illustrates a LIDAR chip used with an external mechanism for steering one or more LIDAR output signals.

FIG. 5A illustrates the LIDAR chip used with a reflecting device 134 and a collimating device 136. For instance, a lens serves as a collimating or focusing device that receives the one or more LIDAR output signals and provides collimation or focusing of the one or more LIDAR output signals. A mirror serves as a reflecting device 134 that receives the one or more LIDAR output signals and reflects the one or more LIDAR output signals in the desired direction(s). As is illustrated by the arrow labeled A, the electronics can move the mirror so as to steer the collimated or focused LIDAR output signal(s) and/or scan the collimated or focused LIDAR output signal(s). The movement of the mirror can be in two dimensions or three dimensions. Suitable mirrors include, but are not limited to, mechanically driven mirrors and Micro Electro Mechanical System (MEMS) mirrors.

Figure 5B:
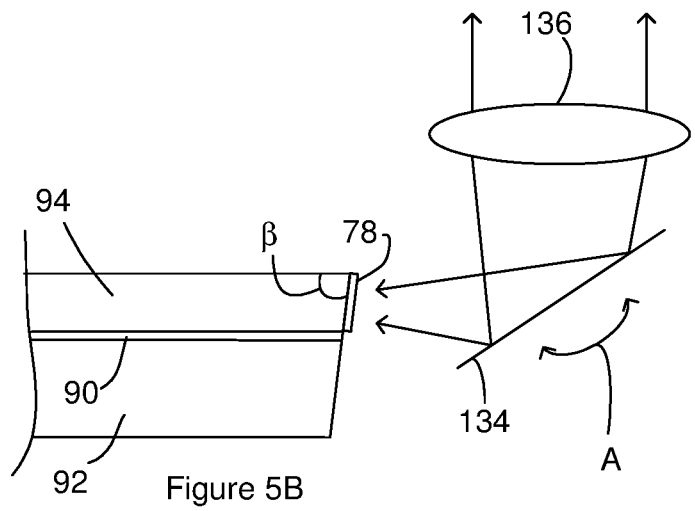
FIG. 5B illustrates a LIDAR chip used with an external mechanism for steering one or more LIDAR output signals.

FIG. 5B illustrates the LIDAR chip used with a reflecting device 134 and a collimating or focusing device. For instance, a mirror serves as a reflecting device 134 that receives the one or more LIDAR output signals and reflects the one or more LIDAR output signals in the desired direction. As is illustrated by the arrow labeled A, the electronics can move the mirror so as to steer the one or more LIDAR output signals and/or scan the one or more LIDAR output signals to different sample regions in a field of view. A lens serves as a collimating or focusing device that receives the one or more LIDAR output signals from the mirror and provides collimation or focusing of the one or more LIDAR output signals. The lens can be configured to move with the movement of the mirror so the lens continues to receive the one or more LIDAR output signals at different positions of the mirror. Alternately, the movement of the mirror can be sufficiently limited that the lens continues to receive the one or more LIDAR output signals at different positions of the mirror. The movement of the mirror can be in two dimensions or three dimensions. Suitable mirrors include, but are not limited to, mechanically driven mirrors and Micro Electro Mechanical System (MEMS) mirrors.

Figure 6A:
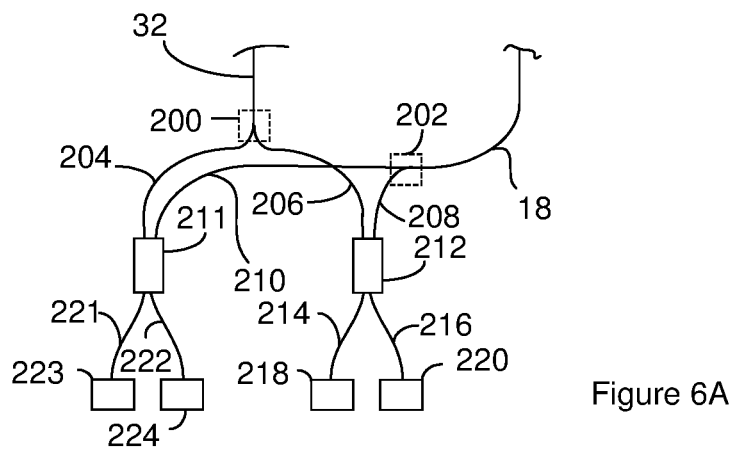
FIG. 6A illustrates an example of a processing unit suitable for use with the LIDAR system of FIG. 1A and/or FIG. 1B.
Figure 6B:
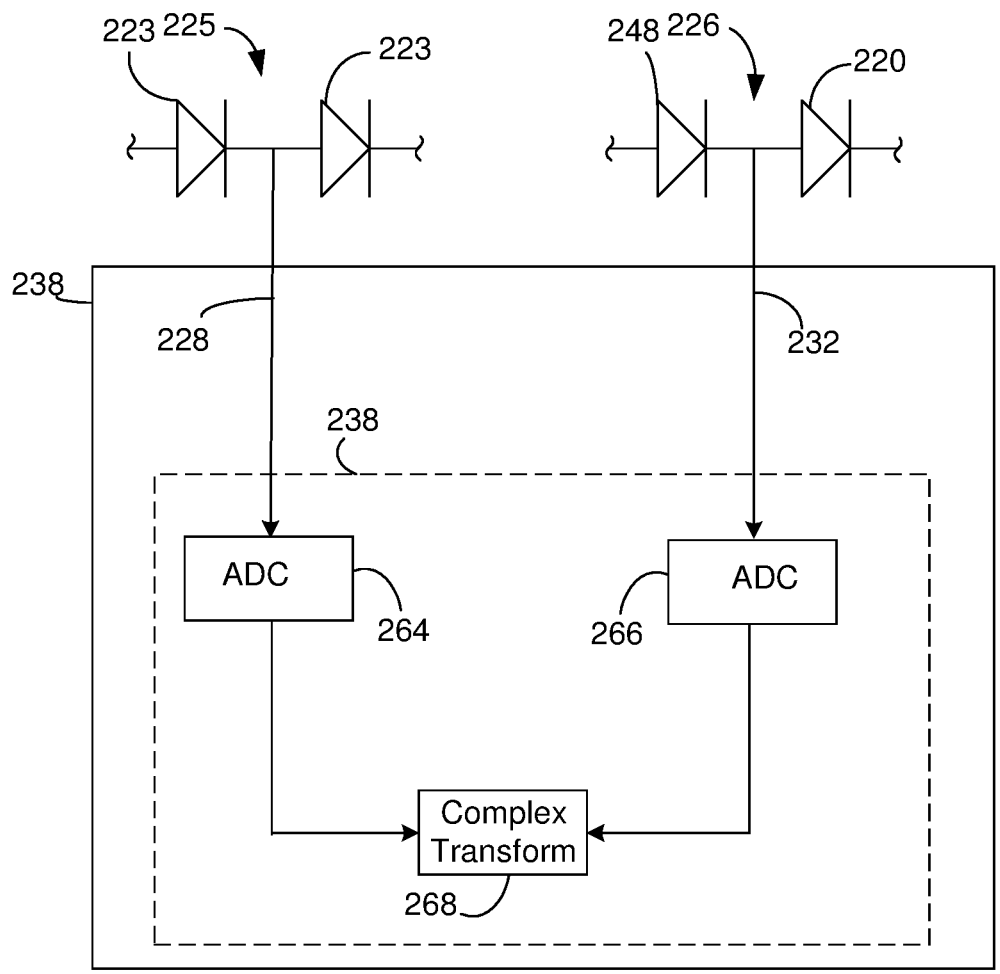
FIG. 6B provides a schematic of electronics that are suitable for use with a processing unit constructed according to FIG. 6A.

FIG. 6A through FIG. 6B illustrate an example of a suitable processing component 20 for use as one of the processing components 20 in the above LIDAR chips. As described in the context of FIG. 1A and FIG. 1B, each processing component 20 receives a comparative signal from a comparative waveguide 18 and a reference signal from a reference waveguide 32. The processing unit includes a second splitter 200 that divides the comparative signal carried on the comparative waveguide 18 onto a first comparative waveguide 204 and a second comparative waveguide 206. The first comparative waveguide 204 carries a first portion of the comparative signal to the light-combining component 211. The second comparative waveguide 208 carries a second portion of the comparative signal to the second light-combining component 212.

The processing unit includes a first splitter 202 that divides the reference signal carried on the reference waveguide 32 onto a first reference waveguide 204 and a second reference waveguide 206. The first reference waveguide 204 carries a first portion of the reference signal to the light-combining component 211. The second reference waveguide 208 carries a second portion of the reference signal to the second light-combining component 212.

The second light-combining component 212 combines the second portion of the comparative signal and the second portion of the reference signal into a second composite signal. Due to the difference in frequencies between the second portion of the comparative signal and the second portion of the reference signal, the second composite signal is beating between the second portion of the comparative signal and the second portion of the reference signal.

The second light-combining component 212 also splits the resulting second composite signal onto a first auxiliary detector waveguide 214 and a second auxiliary detector waveguide 216. The first auxiliary detector waveguide 214 carries a first portion of the second composite signal to a first auxiliary light sensor 218 that converts the first portion of the second composite signal to a first auxiliary electrical signal. The second auxiliary detector waveguide 216 carries a second portion of the second composite signal to a second auxiliary light sensor 220 that converts the second portion of the second composite signal to a second auxiliary electrical signal. Examples of suitable light sensors include germanium photodiodes (PDs), and avalanche photodiodes (APDs).

In some instances, the second light-combining component 212 splits the second composite signal such that the portion of the comparative signal (i.e. the portion of the second portion of the comparative signal) included in the first portion of the second composite signal is phase shifted by 180° relative to the portion of the comparative signal (i.e. the portion of the second portion of the comparative signal) in the second portion of the second composite signal but the portion of the reference signal (i.e. the portion of the second portion of the reference signal) in the second portion of the second composite signal is not phase shifted relative to the portion of the reference signal (i.e. the portion of the second portion of the reference signal) in the first portion of the second composite signal. Alternately, the second light-combining component 212 splits the second composite signal such that the portion of the reference signal (i.e. the portion of the second portion of the reference signal) in the first portion of the second composite signal is phase shifted by 180° relative to the portion of the reference signal (i.e. the portion of the second portion of the reference signal) in the second portion of the second composite signal but the portion of the comparative signal (i.e. the portion of the second portion of the comparative signal) in the first portion of the second composite signal is not phase shifted relative to the portion of the comparative signal (i.e. the portion of the second portion of the comparative signal) in the second portion of the second composite signal. Examples of suitable light sensors include germanium photodiodes (PDs), and avalanche photodiodes (APDs).

The first light-combining component 211 combines the first portion of the comparative signal and the first portion of the reference signal into a first composite signal. Due to the difference in frequencies between the first portion of the comparative signal and the first portion of the reference signal, the first composite signal is beating between the first portion of the comparative signal and the first portion of the reference signal.

The light-combining component 211 also splits the first composite signal onto a first detector waveguide 221 and a second detector waveguide 222. The first detector waveguide 221 carries a first portion of the first composite signal to a first light sensor 223 that converts the first portion of the second composite signal to a first electrical signal. The second detector waveguide 222 carries a second portion of the second composite signal to a second auxiliary light sensor 224 that converts the second portion of the second composite signal to a second electrical signal. Examples of suitable light sensors include germanium photodiodes (PDs), and avalanche photodiodes (APDs).

In some instances, the light-combining component 211 splits the first composite signal such that the portion of the comparative signal (i.e. the portion of the first portion of the comparative signal) included in the first portion of the composite signal is phase shifted by 180° relative to the portion of the comparative signal (i.e. the portion of the first portion of the comparative signal) in the second portion of the composite signal but the portion of the reference signal (i.e. the portion of the first portion of the reference signal) in the first portion of the composite signal is not phase shifted relative to the portion of the reference signal (i.e. the portion of the first portion of the reference signal) in the second portion of the composite signal. Alternately, the light-combining component 211 splits the composite signal such that the portion of the reference signal (i.e. the portion of the first portion of the reference signal) in the first portion of the composite signal is phase shifted by 180° relative to the portion of the reference signal (i.e. the portion of the first portion of the reference signal) in the second portion of the composite signal but the portion of the comparative signal (i.e. the portion of the first portion of the comparative signal) in the first portion of the composite signal is not phase shifted relative to the portion of the comparative signal (i.e. the portion of the first portion of the comparative signal) in the second portion of the composite signal.

When the second light-combining component 212 splits the second composite signal such that the portion of the comparative signal in the first portion of the second composite signal is phase shifted by 180° relative to the portion of the comparative signal in the second portion of the second composite signal, the light-combining component 211 also splits the composite signal such that the portion of the comparative signal in the first portion of the composite signal is phase shifted by 180° relative to the portion of the comparative signal in the second portion of the composite signal. When the second light-combining component 212 splits the second composite signal such that the portion of the reference signal in the first portion of the second composite signal is phase shifted by 180° relative to the portion of the reference signal in the second portion of the second composite signal, the light-combining component 211 also splits the composite signal such that the portion of the reference signal in the first portion of the composite signal is phase shifted by 180° relative to the portion of the reference signal in the second portion of the composite signal.

The first reference waveguide 210 and the second reference waveguide 208 are constructed to provide a phase shift between the first portion of the reference signal and the second portion of the reference signal. For instance, the first reference waveguide 210 and the second reference waveguide 208 can be constructed so as to provide a 90 degree phase shift between the first portion of the reference signal and the second portion of the reference signal. As an example, one reference signal portion can be an in-phase component and the other a quadrature component. Accordingly, one of the reference signal portions can be a sinusoidal function and the other reference signal portion can be a cosine function. In one example, the first reference waveguide 210 and the second reference waveguide 208 are constructed such that the first reference signal portion is a cosine function and the second reference signal portion is a sine function. Accordingly, the portion of the reference signal in the second composite signal is phase shifted relative to the portion of the reference signal in the first composite signal, however, the portion of the comparative signal in the first composite signal is not phase shifted relative to the portion of the comparative signal in the second composite signal.

The first light sensor 223 and the second light sensor 224 can be connected as a balanced detector and the first auxiliary light sensor 218 and the second auxiliary light sensor 220 can also be connected as a balanced detector. For instance, FIG. 6B provides a schematic of the relationship between the electronics, the first light sensor 223, the second light sensor 224, the first auxiliary light sensor 218, and the second auxiliary light sensor 220. The symbol for a photodiode is used to represent the first light sensor 223, the second light sensor 224, the first auxiliary light sensor 218, and the second auxiliary light sensor 220 but one or more of these sensors can have other constructions. In some instances, all of the components illustrated in the schematic of FIG. 6B are included on the LIDAR chip. In some instances, the components illustrated in the schematic of FIG. 6B are distributed between the LIDAR chip and electronics located off of the LIDAR chip.

The electronics connect the first light sensor 223 and the second light sensor 224 as a first balanced detector 225 and the first auxiliary light sensor 218 and the second auxiliary light sensor 220 as a second balanced detector 226. In particular, the first light sensor 223 and the second light sensor 224 are connected in series. Additionally, the first auxiliary light sensor 218 and the second auxiliary light sensor 220 are connected in series. The serial connection in the first balanced detector is in communication with a first data line 228 that carries the output from the first balanced detector as a first data signal. The serial connection in the second balanced detector is in communication with a second data line 232 that carries the output from the second balanced detector as a second data signal. The first data signal is an electrical representation of the first composite signal and the second data signal is an electrical representation of the second composite signal. Accordingly, the first data signal includes a contribution from a first waveform and a second waveform and the second data signal is a composite of the first waveform and the second waveform. The portion of the first waveform in the first data signal is phase-shifted relative to the portion of the first waveform in the first data signal but the portion of the second waveform in the first data signal being in-phase relative to the portion of the second waveform in the first data signal. For instance, the second data signal includes a portion of the reference signal that is phase shifted relative to a different portion of the reference signal that is included the first data signal. Additionally, the second data signal includes a portion of the comparative signal that is in-phase with a different portion of the comparative signal that is included in the first data signal. The first data signal and the second data signal are beating as a result of the beating between the comparative signal and the reference signal, i.e. the beating in the first composite signal and in the second composite signal.

The electronics 62 includes a transform mechanism 238 configured to perform a mathematical transform on the first data signal and the second data signal. For instance, the mathematical transform can be a complex Fourier transform with the first data signal and the second data signal as inputs. Since the first data signal is an in-phase component and the second data signal its quadrature component, the first data signal and the second data signal together act as a complex data signal where the first data signal is the real component and the second data signal is the imaginary component of the input.

The transform mechanism 238 includes a first Analog-to-Digital Converter (ADC) 264 that receives the first data signal from the first data line 228. The first Analog-to-Digital Converter (ADC) 264 converts the first data signal from an analog form to a digital form and outputs a first digital data signal. The transform mechanism 238 includes a second Analog-to-Digital Converter (ADC) 266 that receives the second data signal from the second data line 232. The second Analog-to-Digital Converter (ADC) 266 converts the second data signal from an analog form to a digital form and outputs a second digital data signal. The first digital data signal is a digital representation of the first data signal and the second digital data signal is a digital representation of the second data signal. Accordingly, the first digital data signal and the second digital data signal act together as a complex signal where the first digital data signal acts as the real component of the complex signal and the second digital data signal acts as the imaginary component of the complex data signal.

The transform mechanism 238 includes a transform component 268 that receives the complex data signal. For instance, the transform component 268 receives the first digital data signal from the first Analog-to-Digital Converter (ADC) 264 as an input and also receives the second digital data signal from the first Analog-to-Digital Converter (ADC) 266 as an input. The transform component 268 can be configured to perform a mathematical transform on the complex signal so as to convert from the time domain to the frequency domain. The mathematical transform can be a complex transform such as a complex Fast Fourier Transform (FFT). A complex transform such as a complex Fast Fourier Transform (FFT) provides an unambiguous solution for the shift in frequency of LIDAR input signal relative to the LIDAR output signal that is caused by the radial velocity between the reflecting object and the LIDAR chip. The electronics use the one or more frequency peaks output from the transform component 268 for further processing to generate the LIDAR data (distance and/or radial velocity between the reflecting object and the LIDAR chip or LIDAR system). The transform component 268 can execute the attributed functions using firmware, hardware or software or a combination thereof.

Figure 6C:
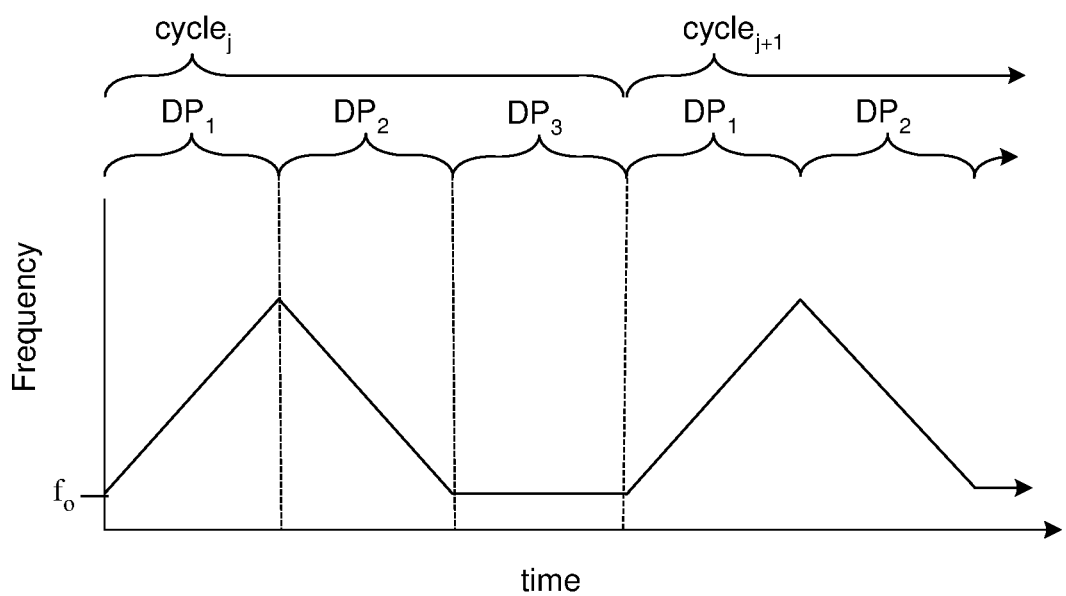
FIG. 6C is a graph of frequency versus time for one of the channels included in a LIDAR output signal.

FIG. 6C shows an example of a relationship between the frequency of the LIDAR output signal, time, cycles and data periods. Although FIG. 6C shows frequency versus time for only one channel, the illustrated frequency versus time pattern can represent the frequency versus time for each of the channels. The base frequency of the LIDAR output signal ($f_o$) can be the frequency of the LIDAR output signal at the start of a cycle.

FIG. 6C shows frequency versus time for a sequence of two cycles labeled cycle$_j$ and cycle$_{j+1}$. In some instances, the frequency versus time pattern is repeated in each cycle as shown in FIG. 6C. The illustrated cycles do not include re-location periods and/or re-location periods are not located between cycles. As a result, FIG. 6C illustrates the results for a continuous scan.

Each cycle includes K data periods that are each associated with a period index k and are labeled DP$_k$. In the example of FIG. 6C, each cycle includes three data periods labeled DP$_k$ with k=1, 2, and 3. In some instances, the frequency versus time pattern is the same for the data periods that correspond to each other in different cycles as is shown in FIG. 6C. Corresponding data periods are data periods with the same period index. As a result, each data period DP$_1$ can be considered corresponding data periods and the associated frequency versus time patterns are the same in FIG. 6C. At the end of a cycle, the electronics return the frequency to the same frequency level at which it started the previous cycle.

During the data period DP$_1$, and the data period DP$_2$, the electronics operate the light source such that the frequency of the LIDAR output signal changes at a linear rate $\alpha$. The direction of the frequency change during the data period DP$_1$ is the opposite of the direction of the frequency change during the data period DP$_2$.

The frequency output from the Complex Fourier transform represents the beat frequency of the composite signals that each includes a comparative signal beating against a reference signal. The beat frequencies ($f_{LDP}$) from two or more different data periods can be combined to generate the LIDAR data. For instance, the beat frequency determined from $DP_1$ in FIG. 6C can be combined with the beat frequency determined from $DP_2$ in FIG. 6C to determine the LIDAR data. As an example, the following equation applies during a data period where electronics increase the frequency of the outgoing LIDAR signal during the data period such as occurs in data period $DP_1$ of FIG. 6C: $f_{ub}=-f_d+\alpha\tau$ where $f_{ub}$ is the frequency provided by the transform component 268 ($f_{LDP}$ determined from $DP_1$ in this case), $f_d$ represents the Doppler shift ($f_d=2vf_c/c$) where $f_c$ represents the optical frequency ($f_o$), c represents the speed of light, v is the radial velocity between the reflecting object and the LIDAR system where the direction from the reflecting object toward the LIDAR system is assumed to be the positive direction, and c is the speed of light. The following equation applies during a data period where electronics decrease the frequency of the outgoing LIDAR signal such as occurs in data period $DP_2$ of FIG. 6C: $f_{db}=-f_d-\alpha\tau$ where $f_{db}$ is a frequency provided by the transform component 268 ($f_{i,LDP}$ determined from $DP_2$ in this case). In these two equations, $f_d$ and $\tau$ are unknowns. The electronics solve these two equations for the two unknowns. The radial velocity for the sample region then be determined from the Doppler shift ($v=c*f_d/(2f_c)$) and/or the separation distance for that sample region can be determined from $c*f_\tau/2$. Since the LIDAR data can be generated for each corresponding frequency pair output by the transform, separate LIDAR data can be generated for each of the objects in a sample region. Accordingly, the electronics can determine more than one radial velocity and/or more than one radial separation distance from a single sampling of a single sample region in the field of view.

The data period labeled $DP_3$ in FIG. 6C is optional. As noted above, there are situations where more than one object is present in a sample region. For instance, during the feedback period in $DP_1$ for $cycle_2$ and also during the feedback period in $DP_2$ for $cycle_2$, more than one frequency pair can be matched. In these circumstances, it may not be clear which frequency peaks from $DP_2$ correspond to which frequency peaks from $DP_1$. As a result, it may be unclear which frequencies need to be used together to generate the LIDAR data for an object in the sample region. As a result, there can be a need to identify corresponding frequencies. The identification of corresponding frequencies can be performed such that the corresponding frequencies are frequencies from the same reflecting object within a sample region. The data period labeled $DP_3$ can be used to find the corresponding frequencies. LIDAR data can be generated for each pair of corresponding frequencies and is considered and/or processed as the LIDAR data for the different reflecting objects in the sample region.

An example of the identification of corresponding frequencies uses a LIDAR system where the cycles include three data periods ($DP_1$, $DP_2$, and $DP_3$) as shown in FIG. 6C. When there are two objects in a sample region illuminated by the LIDAR outputs signal, the transform component 268 outputs two different frequencies for $f_{ub}$: $f_{u1}$ and $f_{u2}$ during $DP_1$ and another two different frequencies for $f_{db}$: $f_{d1}$ and $f_{d2}$ during $DP_2$. In this instance, the possible frequency pairings are: ($f_{d1}$, $f_{u1}$); ($f_{d1}$, $f_{u2}$); ($f_{d2}$, $f_{u1}$); and ($f_{d2}$, $f_{du2}$). A value of $f_d$ and $\tau$ can be calculated for each of the possible frequency pairings. Each pair of values for $f_d$ and $\tau$ can be substituted into $f_3=-f_d+\alpha_3\tau_0$ to generate a theoretical $f_3$ for each of the possible frequency pairings. The value of $\alpha_3$ is different from the value of a used in $DP_1$ and $DP_2$. In FIG. 6C, the value of $\alpha_3$ is zero. In this case, the transform components 268 also outputs two values for $f_3$ that are each associated with one of the objects in the sample region. The frequency pair with a theoretical $f_3$ value closest to each of the actual $f_3$ values is considered a corresponding pair. LIDAR data can be generated for each of the corresponding pairs as described above and is considered and/or processed as the LIDAR data for a different one of the reflecting objects in the sample region. Each set of corresponding frequencies can be used in the above equations to generate LIDAR data. The generated LIDAR data will be for one of the objects in the sample region. As a result, multiple different LIDAR data values can be generated for a sample region where each of the different LIDAR data values corresponds to a different one of the objects in the sample region.

The LIDAR data results described in the context of FIG. 6A through FIG. 6C are generated by a single processing unit 20. However, as described above, the LIDAR system includes multiple processing units 20 that each receives a different channel. As a result, when different channels are concurrently directed to different sample regions in a field of view, the LIDAR results generated by the processing units 20, the LIDAR results are each associated with a different sample region in the field of view.

As is evident from FIG. 2A and FIG. 3A, the output component can be integrated with a LIDAR chip that generates the outgoing LIDAR signal and the incoming LIDAR signal. In some instances, the output component is integrated with a LIDAR chip that generates the outgoing LIDAR signal, the incoming LIDAR signal, one or more comparatives signals, and one or more reference signals. However, the illustrated LIDAR chip can be constructed from multiple optical chips that are interfaced with one another. For instance, the output component can be included on a LIDAR chip that receives the outgoing LIDAR signal from another LIDAR chip. Additionally or alternately, the light source need not be included on a LIDAR chip and can be external to the LIDAR chip. For instance, the outgoing LIDAR signal can be provided to a LIDAR chip from an external light source by an optical fiber.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A LIDAR system, comprising:
    a LIDAR chip configured to output a LIDAR output signal;
    the LIDAR chip including a redirection component, alternate waveguides, and an optical switch configured to direct an outgoing LIDAR signal to any one of the alternate waveguides,
        the redirection component having a return surface and being configured to receive the outgoing LIDAR signal from any one of multiple alternate waveguides such that the outgoing LIDAR signal is reflected at the return surface,
        the LIDAR output signal including light from the outgoing LIDAR signal, and
        the redirection component being configured such that a direction that the LIDAR output signal travels away from the LIDAR chip changes in response to a change in the alternate waveguide from which the redirection component receives the outgoing LIDAR signal.

2. The system of claim 1, wherein the LIDAR chip is constructed on a silicon-on-insulator platform.

3. The system of claim 1, wherein the outgoing LIDAR signal travels through a free space region when traveling between the alternate waveguides and the redirection component.

4. The system of claim 1, wherein the surface has a parabolic shape.

5. The system of claim 1, wherein the return surface is an optical grating.

6. The system of claim 5, wherein the optical grating is an echelle grating.

7. The system of claim 1, wherein the outgoing LIDAR signal carries multiple different channels that are each associated with a different wavelength.

8. The system of claim 1, wherein the LIDAR output signal is one of multiple LIDAR output signals that the LIDAR chip is configured to output, and
wherein the redirection component has demultiplexing functionality that separates the outgoing LIDAR signal into multiple different output signals that each carries a different channel, each of the LIDAR output signals including light from one of the output signals.

9. The system of claim 1, wherein the LIDAR chip includes a continuous layer of a light-transmitting medium and the alternate waveguides are each configured to guide the outgoing light signal through a first region of the layer of the light-transmitting medium and the redirection component includes a recess in a second region of the layer of the light-transmitting medium.

10. The system of claim 9, wherein the outgoing LIDAR signal travels through a free space region of the layer of the light-transmitting medium when traveling between the alternate waveguides and the redirection component.

11. The system of claim 10, wherein the LIDAR chip includes a substrate; and
the free space region, the redirection component and the alternate waveguides are each positioned on the substrate.

12. The system of claim 9, wherein the optical switch guides the outgoing light signal through the layer of the light-transmitting medium; and
the system further comprises electronics configured to operate the optical switch so as to change the alternate waveguide to which the switch directs the outgoing LIDAR signal.

13. The system of claim 1, wherein an incident angle of the outgoing LIDAR signal on the redirection component changes in response to a change in the alternate waveguide from which the redirection component receives the outgoing LIDAR signal.

14. The system of claim 1, further comprising: electronics configured to operate the optical switch so as to change the alternate waveguide to which the switch directs the outgoing LIDAR signal.

15. The system of claim 14, wherein the LIDAR chip includes a substrate; and
wherein the optical switch, the redirection component and the alternate waveguides are each positioned on the substrate.

16. The system of claim 15, wherein the LIDAR chip includes a photonic integrated circuit that includes the redirection component, the alternate waveguides, and the optical switch.

* * * * *